US009029024B2

(12) United States Patent
Abe et al.

(10) Patent No.: US 9,029,024 B2
(45) Date of Patent: May 12, 2015

(54) NONAQUEOUS ELECTROLYTE SOLUTION AND ELECTROCHEMICAL ELEMENT USING SAME

(75) Inventors: Koji Abe, Yamaguchi (JP); Kazuhiro Miyoshi, Yamaguchi (JP); Kazuyuki Kawabe, Yamaguchi (JP)

(73) Assignee: UBE Industries, Ltd., Ube-shi (JP)

( * ) Notice: Subject to any disclaimer, the term of this patent is extended or adjusted under 35 U.S.C. 154(b) by 602 days.

(21) Appl. No.: 13/386,841

(22) PCT Filed: Aug. 12, 2010

(86) PCT No.: PCT/JP2010/063715
§ 371 (c)(1),
(2), (4) Date: Mar. 14, 2012

(87) PCT Pub. No.: WO2011/021570
PCT Pub. Date: Feb. 24, 2011

(65) Prior Publication Data
US 2012/0189919 A1 Jul. 26, 2012

(30) Foreign Application Priority Data

Aug. 17, 2009 (JP) .................................. 2009-188470
Nov. 20, 2009 (JP) .................................. 2009-264876

(51) Int. Cl.
*H01M 10/052* (2010.01)
*H01M 6/16* (2006.01)
*H01M 10/0569* (2010.01)
*H01M 10/0568* (2010.01)
*H01M 4/505* (2010.01)
*H01M 4/52* (2010.01)
*H01M 10/0567* (2010.01)
*H01M 4/02* (2006.01)
*H01M 10/0525* (2010.01)

(52) U.S. Cl.
CPC ...... *H01M 10/052* (2013.01); *H01M 2004/027* (2013.01); *H01M 10/0525* (2013.01); *H01M 6/166* (2013.01); *H01M 10/0569* (2013.01); *H01M 10/0568* (2013.01); *H01M 4/505* (2013.01); *H01M 4/52* (2013.01); *H01M 6/164* (2013.01); *H01M 2004/028* (2013.01); *Y02E 60/122* (2013.01); *Y02T 10/7011* (2013.01); *H01M 10/0567* (2013.01); *H01M 6/168* (2013.01); *H01M 2300/0025* (2013.01)

(58) Field of Classification Search
CPC .......... H01M 10/052; H01M 10/0567; H01M 10/0569; H01M 10/0568; H01M 10/0525; H01M 6/168; H01M 6/164; H01M 6/166; H01M 2300/0025; H01M 4/505; H01M 4/52; H01M 2004/027; H01M 2004/028; Y02E 60/122
USPC ......... 429/307, 324, 330, 332, 338, 342, 340, 429/199, 200, 231.1, 231.3, 231.8, 231.95, 429/218.1; 252/62.2
See application file for complete search history.

(56) References Cited

U.S. PATENT DOCUMENTS

2002/0001756 A1   1/2002   Hamamoto et al.
2008/0206649 A1   8/2008   Kawashima

FOREIGN PATENT DOCUMENTS

| EP | 1 672 729 A1 | 6/2006 |
| JP | 2002-343426 A | 11/2002 |
| JP | 2004 87168 | 3/2004 |
| JP | 2006 172950 | 6/2006 |
| JP | 2008 21624 | 1/2008 |
| JP | 2009 93839 | 4/2009 |
| WO | 2008 123014 | 10/2008 |
| WO | WO 2009/057515 A1 | 5/2009 |

OTHER PUBLICATIONS

Extended European Search Report issued Feb. 11, 2014, in European Patent Application No. 10809915.1.
International Search Report Issued Sep. 28, 2010 in PCT/JP10/63715 Filed Aug. 12, 2010.

*Primary Examiner* — Laura Weiner
(74) *Attorney, Agent, or Firm* — Oblon, McClelland, Maier & Neustadt, L.L.P.

(57) ABSTRACT

Disclosed are a nonaqueous electrolytic solution of an electrolyte salt dissolved in a nonaqueous solvent, which contains a sulfonate compound having a specific structure in an amount of from 0.01 to 10% by mass of the nonaqueous electrolytic solution, and an electrochemical device containing the nonaqueous electrolytic solution. The nonaqueous electrolytic solution is excellent in the effect of improving the storage property of primary batteries and improving the cycle property of secondary batteries in use thereof at high temperatures and the low-temperature property thereof after high-temperature cycles.

20 Claims, No Drawings

NONAQUEOUS ELECTROLYTE SOLUTION AND ELECTROCHEMICAL ELEMENT USING SAME

CROSS REFERENCE TO RELATED APPLICATIONS

The present application is a 35 U.S.C. §371 national stage patent application of International patent application PCT /JP2010/063715, filed on Aug. 12, 2010, published as WO/2011/021570 on Feb. 24, 2011, the text of which is incorporated by reference, and claims the benefit of the filing date of Japanese application nos. 2009-188470, filed on Aug. 17, 2009, and 2009-264876, filed on Nov. 20, 2009, the text of each of which is also incorporated by reference.

TECHNICAL FIELD

The present invention relates to a nonaqueous electrolytic solution capable of improving electrochemical characteristics, and to an electrochemical device using it.

BACKGROUND ART

In recent years, electrochemical devices, especially lithium secondary batteries have been widely used as power supplies for electronic devices such as mobile telephones, notebook-size personal computers and the like, power supplies for electric vehicles, as well as for electric power storage. These electronic devices and vehicles may be used in a broad temperature range, for example, at midsummer high temperatures or at frigid low temperatures, and are therefore required to be improved in point of the discharge capacity in a broad temperature range even after long-term use.

In this specification, the term of lithium secondary battery is used as a concept including so-called lithium ion secondary batteries.

For example, it is known that, in a lithium secondary battery using a highly-crystalline carbon material such as natural graphite, artificial graphite or the like as the negative electrode material therein, the decomposed product generated through reductive decomposition of the solvent in the nonaqueous electrolytic solution on the surface of the negative electrode during charging detracts from the electrochemical reaction favorable for the battery, therefore worsening the cycle property of the battery. Deposition of the decomposed product of the nonaqueous solvent interferes with smooth absorption and release of lithium by the negative electrode, and therefore, in particular, the load characteristics at low temperatures may be thereby often worsened.

In addition, it is known that a lithium secondary battery using a lithium metal or its alloy, or a metal elemental substance such as tin, silicon or the like or its metal oxide as the negative electrode material therein may have a high initial battery capacity but its battery performance such as battery capacity and cycle property greatly worsens, since the micronized powdering of the material is promoted during cycles thereby bringing about accelerated reductive decomposition of the nonaqueous solvent, as compared with the negative electrode of a carbon material. In addition, the micronized powdering of the negative electrode material and the deposition of the decomposed product of the nonaqueous solvent may interfere with smooth absorption and release of lithium by the negative electrode, and therefore, in particular, the load characteristics at low temperatures may be thereby often worsened.

On the other hand, it is known that, in a lithium secondary battery using, for example, $LiCoO_2$, $LiMn_2O_4$, $LiNiO_2$ or $LiFePO_4$ as the positive electrode, when the nonaqueous solvent in the nonaqueous electrolytic solution is heated at a high temperature in the charged state, the decomposed product thereby locally generated through partial oxidative decomposition in the interface between the positive electrode material and the nonaqueous electrolytic solution interferes with the electrochemical reaction favorable for the battery, and therefore the cycle property and the low-temperature property after cycles are thereby also worsened.

As in the above, the decomposed product generated through decomposition of the nonaqueous electrolytic solution on the positive electrode or the negative electrode interferes with the movement of lithium ions, and the battery performance is thereby worsened. Despite the situation, electronic appliances equipped with lithium secondary batteries therein are offering more and more an increasing range of functions and are being in a stream of further increase in the power consumption. With that, the capacity of lithium secondary batteries is being much increased, and the space volume for the nonaqueous electrolytic solution in the battery is decreased by increasing the density of the electrode and by reducing the useless space volume in the battery. Accordingly, the situation is that even decomposition of only a small amount of the nonaqueous electrolytic solution may worsen the battery performance at low temperatures.

Patent Reference 1 shows that, in a lithium secondary battery in which the battery interterminal off-load voltage is at least 4.25 V at 25° C. at the end of charging, a compound having two specific sulfonyloxy groups bonding to each other via a linking group therebetween ([Chemical Formula 1] in [Claim 1]) is effective for enhancing the cycle property at 25° C. and for preventing gas generation in continuous charging at 60° C. Further, in Paragraph [0039] therein, there are mentioned 1,4-benzenediol disulfonates each having only one of two and the same substituents, sulfonyloxy groups on the benzene ring. However, even when the compound of the type is added to a nonaqueous electrolytic solution, the low-temperature property after high-temperature cycles is not still sufficiently satisfactory.

Patent Reference 2 provides a reagent capable of sufficiently functioning as an overcharge preventing mechanism even when used in a 4 V-level battery to be charged with a large current, and shows a nonaqueous electrolytic solution using for secondary battery which uses the reagent and which therefore enjoys the advantages of high energy density, excellent safety and cost reduction. The patent reference shows, as one example of the reagent of the type, 1,2-dimethoxybenzene having only two and the same substituents, alkoxy groups on one benzene ring, which, however, has a problem in that the low-temperature property after high-temperature cycles rather worsen.

Patent Reference 3 shows that, when an electrolytic solution containing a biphenyl derivative such as 4-phenylphenyl methanesulfonate or the like added thereto is used therein, then a lithium secondary battery can be provided that is excellent in cycle property in charging and discharging under a high voltage condition of such that the uppermost voltage is higher than 4.1 V and/or under a high temperature condition of not lower than 40° C., and is further excellent in battery characteristics such as electric capacity and storage property in a charged state.

Patent Reference 4 shows that use of an electrolytic solution containing 2-cyclohexylphenylmethyl carbonate added thereto improves the safety in overcharging of a lithium secondary battery and the high-temperature storage property thereof.

As a lithium primary battery, for example, used is one in which the positive electrode is formed of manganese dioxide or fluorographite and the negative electrode is formed of lithium metal, and the lithium primary battery of the type is widely used as having a high energy density, for which, however, it is desired to prevent the increase in the internal resistance after storage at high temperatures and to enhance the discharge characteristics in a broad temperature range even after storage.

Further, recently, as a new power source for electric vehicles or hybrid electric vehicles, an electric double-layer capacitor that uses active carbon or the like as the electrode thereof has become developed from the viewpoint of the output density, and from the viewpoint of satisfying both the energy density and the output density, an electric storage device of a hybrid capacitor based on the combination of the storage principle of a lithium ion secondary battery and that of an electric double-layer capacitor (the hybrid capacitor of the type takes advantage of both the lithium absorption/release capacitance and the electric double-layer capacitance), which may be referred to also as a lithium ion capacitor, has become developed; and for these, development of the discharge performance in a broad temperature range even after long-term use is desired.

CITATION LIST

Patent References

Patent Reference 1: JP-A 2006-351337
Patent Reference 2: JP-A 2000-156243
Patent Reference 3: JP-A 2001-332297
Patent Reference 4: JP-A 2009-231283

DISCLOSURE OF THE INVENTION

Problems that the Invention is to Solve

The present inventors have investigated in detail the performance of the nonaqueous electrolytic solution in the above-mentioned prior art. As a result, the present inventors have known that the above-mentioned patent references all do not specifically note the cycle property at high temperatures and the low-temperature property after cycles, and in actual experiments, the disclosed techniques are almost ineffective for enhancing the cycle property at high temperatures and the low-temperature property after high-temperature cycles worsen.

An object of the present invention is to provide a nonaqueous electrolytic solution excellent in improving the low-temperature discharge characteristics of primary batteries after storage at high temperatures and in improving the cycle property of secondary batteries in use at high temperatures and the low-temperature property thereof after high-temperature cycles, and to provide an electrochemical device using the nonaqueous electrolytic solution.

Means for Solving the Problems

The present inventors have assiduously studied for the purpose of solving the above-mentioned problems and, as a result, have found an extreme effect that, when a small amount of an alkoxyphenyl alkanesulfonate compound or an alkoxyphenyl arylsulfonate compound having both the two substituents of two and quite different substituents, an alkoxy group (—OR$^1$ group) and a sulfonyloxy group (—OS(=O)$_2$R$^2$ group) [R$^2$ is alkyl or aryl], on one benzene ring therein is added to a nonaqueous electrolytic solution, then the load characteristics and the low-temperature property of batteries even after high-temperature cycles in assumption of long-term use thereof do not worsen. This effect could not be attained when a compound having only two and the same alkoxy groups on one benzene ring therein, or a compound having only two and the same sulfonyloxy groups on one benzene ring therein is added to a nonaqueous electrolytic solution.

In this specification, "sulfonyloxy group" is used as a concept including an alkanesulfonyloxy group and an arylsulfonyl group; and similarly, "sulfonate" is also used as a concept including an alkanesulfonate and an arylsulfonate.

In addition, the present inventors have found an extreme effect that, when a compound having three of a cyclohexane ring, a benzene ring and a sulfonyloxy group (—OS(=O)$_2$R$^2$ group) is added to a nonaqueous electrolytic solution, then the load characteristics and the low-temperature property of batteries even after high-temperature cycles in assumption of long-term use thereof do not worsen.

Specifically, the present invention provides the following (1) and (2):

(1) A nonaqueous electrolytic solution of an electrolyte salt dissolved in a nonaqueous solvent, which contains a sulfonate compound represented by any of the following general formulae (I) to (III) in an amount of from 0.01 to 10% by mass of the nonaqueous electrolytic solution:

[Chemical Formula 1]

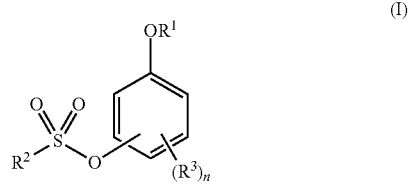

(I)

(wherein R$^1$ represents an alkyl group having from 1 to 6 carbon atoms; R$^2$ represents an alkyl group having from 1 to 6 carbon atoms, or a halogenoalkyl group having from 1 to 6 carbon atoms in which at least one hydrogen is substituted with a halogen atom, or an aryl group having from 6 to 12 carbon atoms in which the hydrogen atom may be substituted with a halogen atom; R$^3$ represents a hydrogen atom, an alkyl group having from 1 to 6 carbon atoms, an —OR$^1$ group, an —OS(=O)$_2$R$^2$ group, an —OC(=O)R$^4$ group, or a halogen atom; n indicates an integer of from 0 to 4; R$^4$ represents a hydrogen atom, an alkyl group having from 1 to 6 carbon atoms, or an alkoxy group having from 1 to 6 carbon atoms),

[Chemical Formula 2]

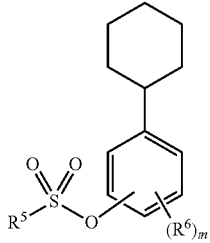

(II)

(wherein $R^5$ represents an alkyl group having from 1 to 6 carbon atoms in which at least one hydrogen atom may be substituted with a halogen atom, or an aryl group having from 6 to 12 carbon atoms in which the hydrogen atom may be substituted with a halogen atom; $R^6$ represents a hydrogen atom, a halogen atom, an alkanesulfonyloxy group having from 1 to 6 carbon atoms in which the hydrogen atom may be substituted with a halogen atom, or an arylsulfonyloxy group having from 6 to 12 carbon atoms in which the hydrogen atom may be substituted with a halogen atom; m indicates an integer of from 0 to 4),

[Chemical Formula 3]

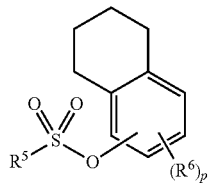

(III)

(wherein $R^5$ and $R^6$ are the same as above; p indicates an integer of from 0 to 3).

(2) An electrochemical device comprising a positive electrode, a negative electrode, and a nonaqueous electrolytic solution of an electrolyte salt dissolved in a nonaqueous solvent, wherein the nonaqueous electrolytic solution contains a sulfonate compound represented by any of the above-mentioned general formulae (I) to (III) in an amount of from 0.01 to 10% by mass of the nonaqueous electrolytic solution.

Advantage of the Invention

According to the invention, there are provided a nonaqueous electrolytic solution excellent in improving the storage property of primary batteries and in improving the cycle property of secondary batteries in use at high temperatures and the low-temperature property thereof after cycles, and an electrochemical device using the nonaqueous electrolytic solution.

MODE FOR CARRYING OUT THE INVENTION

[Nonaqueous Electrolytic Solution]

The nonaqueous electrolytic solution of the present invention comprises an electrolyte salt dissolved in a nonaqueous solvent, and contains an alkanesulfonate compound represented by any of the following general formulae (I) to (III) in an amount of from 0.01 to 10% by mass of the nonaqueous electrolytic solution.

<Sulfonate Compound Represented by General Formula (I)>

The sulfonate compound represented by the general formula (I) has two and quite different substituents, both of an alkoxy group and a sulfonyl oxy group, on one benzene ring therein.

[Chemical Formula 4]

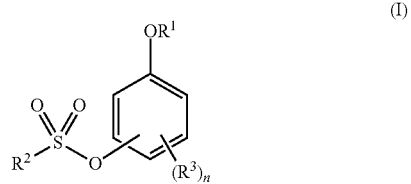

(I)

In the formula, $R^1$ represents an alkyl group having from 1 to 6 carbon atoms, preferably from 1 to 4 carbon atoms; $R^2$ represents an alkyl group having from 1 to 6 carbon atoms, preferably from 1 to 4 carbon atoms, or a halogenoalkyl group having from 1 to 6 carbon atoms, preferably from 1 to 4 carbon atoms, in which at least one hydrogen is substituted with a halogen atom, or an aryl group having from 6 to 12 carbon atoms in which the hydrogen atom may be substituted with a halogen atom; $R^3$ represents a hydrogen atom, an alkyl group having from 1 to 6 carbon atoms, preferably from 1 to 4 carbon atoms, an —$OR^1$ group, an —$OS(=O)_2R^2$ group, an —$OC(=O)R^4$ group, or a halogen atom; n indicates an integer of from 0 to 4; $R^4$ represents a hydrogen atom, an alkyl group having from 1 to 6 carbon atoms, preferably from 1 to 4 carbon atoms, or an alkoxy group having from 1 to 6 carbon atoms, preferably from 1 to 4 carbon atoms.

Specific examples of the alkyl group having from 1 to 6 carbon atoms for $R^1$ include a linear or branched alkyl group such as a methyl group, an ethyl group, an n-propyl group, an n-butyl group, an n-pentyl group, an n-hexyl group, a 2-propyl group, a tert-butyl group, a tert-pentyl group, etc.; and above all, preferred are a methyl group and an ethyl group.

Specific examples of the alkyl group having from 1 to 6 carbon atoms for $R^2$ include a linear alkyl group such as a methyl group, an ethyl group, a propyl group, a butyl group, etc.; and a branched alkyl group such as a 2-propyl group, etc. The halogenoalkyl group having from 1 to 6 carbon atoms for $R^2$ includes a trifluoromethyl group, a 2,2,2-trifluoroethyl group. Of those, preferred are a trifluoromethyl group, a methyl group and an ethyl group; and more preferred are a methyl group and an ethyl group.

$R^3$ represents any of a hydrogen atom, a linear or branched alkyl group having from 1 to 6 carbon atoms, an —$OR^1$ group, an —$OS(=O)_2R^2$ group, an —$OC(=O)R^4$ group, or a halogen atom, but is preferably a hydrogen atom, an alkyl group having from 1 to 6 carbon atoms, an —$OR^1$ group or an —$OS(=O)_2R^2$ group, more preferably an alkyl group having from 1 to 6 carbon atoms or an —$OR^1$ group, even more preferably an alkyl group having from 1 to 4 carbon atoms, still more preferably a branched alkyl group having 3 or 4 carbon atoms.

Preferred examples of the linear or branched alkyl group having from 1 to 4 carbon atoms for $R^3$ include a methyl group, an ethyl group, an n-propyl group, an n-butyl group, an n-pentyl group, an n-hexyl group, a 2-propyl group, a tert-butyl group, a tert-pentyl group, a tert-pentyl group, etc. Of those, preferred are a methyl group, an ethyl group, a tert-butyl group, a tert-pentyl group; and more preferred is a tert-butyl group. The compounds where $R^3$ is a tert-butyl group or a tert-pentyl group are novel substances.

In the case where $R^3$ is an —$OR^1$ group or an —$OS(=O)_2R^2$ group, preferred examples of $R^1$ and $R^2$ therein are the same as those of $R^1$ and $R^2$ mentioned hereinabove.

The substitution position of the sulfonyloxy group (—$OS(=O)_2R^2$ group) may be any of the ortho-, meta- or para-position relative to the alkoxy group (—OR$^1$ group); however, from the viewpoint of the high-temperature cycle property and the low-temperature property after high-temperature cycles, the substituent is preferably ortho- or para-positioned, more preferably para-positioned.

In the case where R$^3$ is an —OC(=O)R$^4$ group, R$^4$ is a hydrogen atom, a linear or branched alkyl group having from 1 to 4 carbon atoms, or a linear or branched alkoxy group having from 1 to 6 carbon atoms. Specific examples of R$^4$ include a hydrogen atom, a methyl group, an ethyl group, an n-propyl group, an n-butyl group, an n-pentyl group, an n-hexyl group, a 2-propyl group, a tert-butyl group, a tert-pentyl group, a methoxy group, an ethoxy group, a propoxy group, a butoxy group, a pentyloxy group, a hexyloxy group, a 2-propoxy group, a tert-butoxy group, a tert-pentyloxy group, etc. Of those, preferred are a hydrogen atom, a methyl group, an ethyl group, a methoxy group, an ethoxy group; and more preferred are a hydrogen atom, a methyl group.

When R$^3$ is a halogen atom, preferred is a fluorine atom, a chlorine atom or a bromine atom, and more preferred is a fluorine atom.

n is an integer of from 0 to 4, preferably from 1 to 4, more preferably n=1. The where n=0 is the same as that where R$^3$ is a hydrogen atom.

Specific examples of the alkanesulfonate compound represented by the general formula (I) are as mentioned below.

(I-1) R$^1$ and R$^2$ are both methyl groups, and R$^3$ is a hydrogen atom.

There are mentioned 2-methoxyphenyl methanesulfonate, 3-methoxyphenyl methanesulfonate, 4-methoxyphenyl methanesulfonate, etc.

(I-2) R$^1$ and R$^2$ are both methyl groups, and R$^3$ is an alkyl group.

There are mentioned 2-methoxy-3-methylphenyl methanesulfonate, 2-methoxy-4-methylphenyl methanesulfonate, 2-methoxy-5-methylphenyl methanesulfonate, 3-methoxy-2-methylphenyl methanesulfonate, 3-methoxy-4-methylphenyl methanesulfonate, 3-methoxy-5-methylphenyl methanesulfonate, 4-methoxy-2-methylphenyl methanesulfonate, 4-methoxy-3-methylphenyl methanesulfonate, 3-tert-butyl-2-methoxyphenyl methanesulfonate, 4-tert-butyl-2-methoxyphenyl methanesulfonate, 5-tert-butyl-2-methoxyphenyl methanesulfonate, 2-tert-butyl-3-methoxyphenyl methanesulfonate, 4-tert-butyl-3-methoxyphenyl methanesulfonate, 5-tert-butyl-3-methoxyphenyl methanesulfonate, 2-tert-butyl-4-methoxyphenyl methanesulfonate, 3-tert-butyl-4-methoxyphenyl methanesulfonate, etc.

(I-3) R$^1$ and R$^2$ are both methyl groups, and R$^3$ is an —OR$^1$ group.

There are mentioned 2,3-dimethoxyphenyl methanesulfonate, 2,4-dimethoxyphenyl methanesulfonate, 2,5-dimethoxyphenyl methanesulfonate, 2,6-dimethoxyphenyl methanesulfonate, 3,4-dimethoxyphenyl methanesulfonate, 3,5-dimethoxyphenyl methanesulfonate, etc.

(I-4) R$^1$ and R$^2$ are both methyl groups, and R$^3$ is an —OS(=O)$_2$R$^2$ group.

There are mentioned 3-methoxy-1,2-phenylene dimethanesulfonate, 4-methoxy-1,2-phenylene dimethanesulfonate, 2-methoxy-1,3-phenylene dimethanesulfonate, 4-methoxy-1,3-phenylene dimethanesulfonate, 5-methoxy-1,3-phenylene dimethanesulfonate, 2-methoxy-1,4-phenylene dimethanesulfonate, 3-methoxy-1,4-phenylene dimethanesulfonate, etc.

(I-5) R$^1$ and R$^2$ are both methyl groups, and R$^3$ is an —OC(=O)R$^4$ group.

There are mentioned 3-formyl-2-methoxyphenyl methanesulfonate, 4-formyl-2-methoxyphenyl methanesulfonate, 5-formyl-2-methoxyphenyl methanesulfonate, 2-formyl-3-methoxyphenyl methanesulfonate, 4-formyl-3-methoxyphenyl methanesulfonate, 5-formyl-3-methoxyphenyl methanesulfonate, 2-formyl-4-methoxyphenyl methanesulfonate, 3-formyl-4-methoxyphenyl methanesulfonate, 3-acetoxy-2-methoxyphenyl methanesulfonate, 4-acetoxy-2-methoxyphenyl methanesulfonate, 5-acetoxy-2-methoxyphenyl methanesulfonate, 2-acetoxy-3-methoxyphenyl methanesulfonate, 4-acetoxy-3-methoxyphenyl methanesulfonate, 5-acetoxy-3-methoxyphenyl methanesulfonate, 2-acetoxy-4-methoxyphenyl methanesulfonate, 3-acetoxy-4-methoxyphenyl methanesulfonate, 2-methoxy-3-methoxycarbonyloxyphenyl methanesulfonate, 2-methoxy-4-methoxycarbonyloxyphenyl methanesulfonate, 2-methoxy-5-methoxycarbonyloxyphenyl methanesulfonate, 3-methoxy-2-methoxycarbonyloxyphenyl methanesulfonate, 3-methoxy-4-methoxycarbonyloxyphenyl methanesulfonate, 3-methoxy-5-methoxycarbonyloxyphenyl methanesulfonate, 4-methoxy-2-methoxycarbonyloxyphenyl methanesulfonate, 4-methoxy-3-methoxycarbonyloxyphenyl methanesulfonate, etc.

(I-6) R$^1$ and R$^2$ are both methyl groups, and R$^3$ is a halogen atom.

There are mentioned 3-fluoro-2-methoxyphenyl methanesulfonate, 4-fluoro-2-methoxyphenyl methanesulfonate, 5-fluoro-2-methoxyphenyl methanesulfonate, 2-fluoro-3-methoxyphenyl methanesulfonate, 4-fluoro-3-methoxyphenyl methanesulfonate, 5-fluoro-3-methoxyphenyl methanesulfonate, 2-fluoro-4-methoxyphenyl methanesulfonate, 3-fluoro-4-methoxyphenyl methanesulfonate, 3,4-difluoro-2-methoxyphenyl methanesulfonate, 3,5-difluoro-2-methoxyphenyl methanesulfonate, 3,6-difluoro-2-methoxyphenyl methanesulfonate, 4,5-difluoro-2-methoxyphenyl methanesulfonate, 2,4-difluoro-3-methoxyphenyl methanesulfonate, 2,5-difluoro-3-methoxyphenyl methanesulfonate, 4,5-difluoro-3-methoxyphenyl methanesulfonate, 4,6-difluoro-3-methoxyphenyl methanesulfonate, 2,3-difluoro-4-methoxyphenyl methanesulfonate, 2,5-difluoro-4-methoxyphenyl methanesulfonate, 2,6-difluoro-4-methoxyphenyl methanesulfonate, 3,4,5-trifluoro-2-methoxyphenyl methanesulfonate, 3,4,6-trifluoro-2-methoxyphenyl methanesulfonate, 2,4,5-trifluoro-3-methoxyphenyl methanesulfonate, 2,4,6-trifluoro-3-methoxyphenyl methanesulfonate, 4,5,6-trifluoro-3-methoxyphenyl methanesulfonate, 2,3,5-trifluoro-4-methoxyphenyl methanesulfonate, 2,3,6-trifluoro-4-methoxyphenyl methanesulfonate, 3,4,5,6-tetrafluoro-2-methoxyphenyl methanesulfonate, 2,4,5,6-tetrafluoro-3-methoxyphenyl methanesulfonate, 2,3,5,6-tetrafluoro-4-methoxyphenyl methanesulfonate, etc.

(I-7) R$^1$ is an alkyl group having from 2 to 6 carbon atoms, R$^2$ is an alkyl group having from 2 to 6 carbon atoms, a halogenoalkyl group having from 1 to 6 carbon atoms, or an aryl group having from 6 to 12 carbon atoms.

There are mentioned compounds derived from the above-mentioned compounds of (I-1) to (I-6) by changing the substituents of R$^1$ and R$^2$.

Of the above-mentioned compounds of (I-1) to (I-7), preferred are 2-methoxyphenyl methanesulfonate, 4-methoxyphenyl methanesulfonate, 2-methoxy-4-methylphenyl methanesulfonate, 2-methoxy-5-methylphenyl methanesulfonate, 2-tert-butyl-4-methoxyphenyl methanesulfonate, 2,6-dimethoxyphenyl methanesulfonate, 3,5-dimethoxyphenyl methanesulfonate, 3,4-dimethoxyphenyl methanesulfonate, 3-methoxy-1,2-phenylene dimethanesulfonate, 2-methoxy-1,4-phenylene dimethanesulfonate, 5-methoxy-1,3-phenylene dimethanesulfonate, 2-fluoro-4-methoxyphenyl methanesulfonate, 4-fluoro-2-methoxyphenyl methanesulfonate, 4-methoxyphenyl benzenesulfonate, 4-methoxyphenyl 4-methylbenzenesulfonate, 4-methoxyphenyl 2,4,6-trimethylbenzenesulfonate; and more preferred are 4-methoxyphenyl methanesulfonate, 2,6-dimethoxyphenyl methanesulfonate, 2-tert-butyl-4-methoxyphenyl methanesulfonate; and even more preferred is 2-tert-butyl-4-methoxyphenyl methanesulfonate.

Though not always clear, the reason why the sulfonate compound represented by the general formula (I) could improve the high-temperature cycle property and the low-temperature property after high-temperature cycles would be as follows:

The sulfonate compound represented by the general formula (I) forms a sulfur atom-containing stable surface film both on a positive electrode and a negative electrode through electrochemical decomposition, and therefore can inhibit the decomposition of the solvent in a nonaqueous electrolytic solution. The sulfur atom-containing surface film may lower lithium ion conductivity in rare cases; however, the sulfonate compound represented by the general formula (I) further contains an alkoxy group, and therefore facilitates lithium ion movement; and for these reasons, it may be considered that the load characteristics and the low-temperature property of the batteries containing the compound would hardly worsen even after high-temperature cycles. The effect is specific to the compound having two and quite different substituents, an alkoxy group (—OR$^1$ group) and a sulfonyloxy group (—OS(=O)$_2$R$^2$ group) on one benzene ring therein; and when any other compound having two and the same substituents alone thereon, such as 1,4-benzenediol dimethanesulfonate (having two sulfonyloxy groups alone) and 1,2-dimethoxybenzene (having two alkoxy groups alone), the compound is ineffective.

The above-mentioned effect is more remarkable when the substitution position of the sulfonyloxy group is a para-position relative to the alkoxy group, since the lithium ion trapping site, oxygen atom could exist uniformly in the surface film in that case. In addition, in case where the substituent R$^3$ is an alkyl group, an alkoxy group, a sulfonyloxy group, a carbonyloxy group, a halogen atom or the like, the coating film could be prevented from being too much densified, and therefore the low-temperature property after high-temperature cycles of the batteries containing the compound of the type can be further improved.

<Sulfonate Compound Represented by General Formula (II) or (III)>

The sulfonate compound represented by the general formula (II) or (III) has three of a cyclohexane ring, a benzene ring and a sulfonyloxy group.

[Chemical Formula 5]

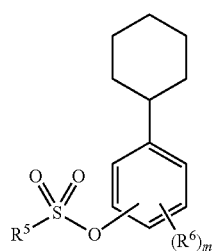

(II)

(wherein R$^5$ represents an alkyl group having from 1 to 6 carbon atoms, preferably from 1 to 4 carbon atoms in which at least one hydrogen atom may be substituted with a halogen atom, or an aryl group having from 6 to 12 carbon atoms in which the hydrogen atom may be substituted with a halogen atom; R$^6$ represents a hydrogen atom, a halogen atom, or a sulfonyloxy group having from 1 to 6 carbon atoms, preferably from 1 to 4 carbon atoms; m indicates an integer of from 0 to 4).

[Chemical Formula 6]

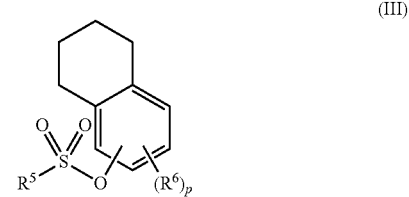

(III)

(wherein R$^5$ and R$^6$ are the same as above; p indicates an integer of from 0 to 3).

The sulfonate compound represented by the general formula (II) may be expressed also as a sulfonyloxybenzene compound represented by the following general formula (IV); and the sulfonate compound represented by the general formula (III) may be expressed also as a sulfonyloxybenzene compound represented by the following general formula (V):

[Chemical Formula 7]

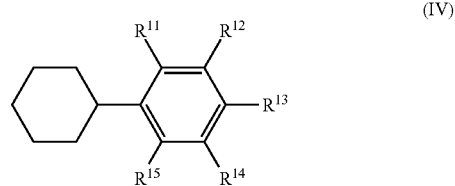

(IV)

(wherein R$^{11}$ to R$^{15}$ each represents any of a hydrogen atom, a halogen atom, or a linear or branched sulfonyloxy group having from 1 to 6 carbon atoms, preferably from 1 to 4 carbon atoms; at least one of R$^{11}$ to R$^{15}$ is a linear or branched sulfonyloxy group having from 1 to 6 carbon atoms, preferably from 1 to 4 carbon atoms, and at least one hydrogen atom of the sulfonyloxy group may be substituted with a halogen atom).

[Chemical Formula 8]

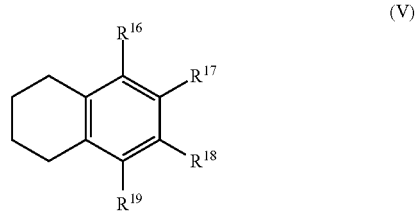

(V)

(wherein R$^{16}$ to R$^{19}$ each represents any of a hydrogen atom, a halogen atom, or a linear or branched sulfonyloxy group having from 1 to 6 carbon atoms, preferably from 1 to 4 carbon atoms; at least one of R$^{16}$ to R$^{19}$ is a linear or branched sulfonyloxy group having from 1 to 6 carbon atoms, preferably from 1 to carbon atoms, and at least one hydrogen atom of the sulfonyloxy group may be substituted with a halogen atom).

As the sulfonyloxy group (—OS(=O)$_2$R$^2$ group) in the general formula (II) or (III), or that is, as the case where any of R$^{11}$ to R$^{19}$ in the general formula (IV) or (V) is a linear or branched sulfonyloxy group having from 1 to 6 carbon atoms, preferred are a methanesulfonyloxy group, an ethanesulfonyloxy group, a propanesulfonyloxy group, a butanesulfonyloxy group, a pentanesulfonyloxy group, a hexanesulfonyloxy group, a benzenesulfonyloxy group, a 4-methylbenzenesulfonyloxy group, a 2,4,6-trimethylbenzenesulfonyloxy group, etc. Of those, more preferred are a methanesulfonyloxy group, an ethanesulfonyloxy group, a propanesulfonyloxy group, a 4-methylbenzenesulfonyloxy group; and even more preferred is a methanesulfonyloxy group.

More preferably, at least one hydrogen atom of the sulfonyloxy group is substituted with a fluorine atom. Above all, especially preferred are a trifluoromethanesulfonyloxy group, a 2,2,2-trifluoroethanesulfonyloxy group, etc.

In case where any of R$^{11}$ to R$^{19}$ in the above-mentioned general formula (IV) or (V) is a halogen atom, preferred are a fluorine atom, a chlorine atom and a bromine atom; and more preferred is a fluorine atom.

The substitution position of the sulfonyloxy group in the general formula (II) may be any of an ortho-, meta- or para-position relative to the cyclohexyl group therein, but is preferably an ortho- or para-position, more preferably a para-position. Specifically, in the case of the general formula (IV), the substituent is preferably ortho-positioned (R$^{11}$ or R$^{15}$) or para-positioned (R$^{13}$) relative to the cyclohexyl group, more preferably para-positioned (R$^{13}$). In the case of the general formula (V), the substitution position of the sulfonyloxy group may be in any position of R$^{16}$ to R$^{19}$, but is preferably in the position of R$^{17}$ or R$^{18}$.

The substituent and the substitution position mentioned above are preferred as more effective for improving the low-temperature property after high-temperature cycles.

Specific examples of the sulfonate compound represented by the general formula (II) (general formula (IV)) where the sulfonyloxy group is a methanesulfonyloxy group include 2-cyclohexylphenyl methanesulfonate, 3-cyclohexylphenyl methanesulfonate, 4-cyclohexylphenyl methanesulfonate, 4-cyclohexylphenyl-1,3-phenylene dimethanesulfonate, 4-cyclohexyl-3-fluorophenyl methanesulfonate, 4-cyclohexyl-2-fluorophenyl methanesulfonate, 4-cyclohexyl-2,3-difluorophenyl methanesulfonate, 4-cyclohexyl-3,5-difluorophenyl methanesulfonate, 4-cyclohexyl-2,5-difluorophenyl methanesulfonate, 4-cyclohexyl-2,6-difluorophenyl methanesulfonate, 4-cyclohexyl-2,3,5-trifluorophenyl methanesulfonate, 4-cyclohexyl-2,3,6-trifluorophenyl methanesulfonate, 4-cyclohexyl-2,3,5,6-tetrafluorophenyl methanesulfonate, etc.

Of those, preferred are 2-cyclohexylphenyl methanesulfonate, 3-cyclohexylphenyl methanesulfonylated, 4-cyclohexylphenyl methanesulfonate; more preferred are 2-cyclohexylphenyl methanesulfonate, 4-cyclohexylphenyl methanesulfonate; and even more preferred is 4-cyclohexylphenyl methanesulfonate.

Specific examples of the sulfonate compound represented by the general formula (III) (general formula (V)) where the sulfonyloxy group is a methanesulfonyloxy group include 5,6,7,8-tetrahydronaphthalen-1-yl methanesulfonate, 5,6,7,8-tetrahydronaphthalen-2-yl methanesulfonate, 5,6,7,8-tetrahydronaphthalene-2,3-diyl dimethanesulfonate, 1-fluoro-5,6,7,8-tetrahydronaphthalen-2-yl methanesulfonate, 3-fluoro-5,6,7,8-tetrahydronaphthalen-2-yl methanesulfonate, 4-fluoro-5,6,7,8-tetrahydronaphthalen-2-yl methanesulfonate, 1,3-difluoro-5,6,7,8-tetrahydronaphthalen-2-yl methanesulfonate, 1,4-difluoro-5,6,7,8-tetrahydronaphthalen-2-yl methanesulfonate, 3,4-difluoro-5,6,7,8-tetrahydronaphthalen-2-yl methanesulfonate, 1,3,4-trifluoro-5,6,7,8-tetrahydronaphthalen-2-yl methanesulfonate, etc.

Of those, more preferred are 5,6,7,8-tetrahydronaphthalen-1-yl methanesulfonate and 5,6,7,8-tetrahydronaphthalen-2-yl methanesulfonate; and more preferred is 5,6,7,8-tetrahydronaphthalen-2-yl methanesulfonate.

Specific examples of the sulfonate compound represented by the general formula (II) (general formula (IV)) or the general formula (III) (general formula (V)) where the sulfonyloxy group is any other substituent than the methanesulfonyloxy group, such as an ethanesulfonyloxy group or the like include those derived from the above-mentioned compounds by replacing the substituent therein.

As the sulfonate compounds represented by the general formula (II) (general formula (IV)) of the above-mentioned compounds, preferred are 2-cyclohexylphenyl methanesulfonate, 4-cyclohexylphenyl methanesulfonate, 2-cyclohexylphenyl ethanesulfonate, 4-cyclohexylphenyl ethanesulfonate, 2-cyclohexylphenyl trifluoromethanesulfonate, 4-cyclohexylphenyl trifluoromethanesulfonate, 2-cyclohexylphenyl 2,2,2-trifluoroethanesulfonate, 4-cyclohexylphenyl 2,2,2-trifluoroethanesulfonate, 2-cyclohexylphenyl 4-methylbenzenesulfonate, 4-cyclohexylphenyl 4-methylbenzenesulfonate, etc.; as the sulfonate compounds represented by the general formula (III) (general formula (V)), preferred are 5,6,7,8-tetrahydronaphthalen-1-yl methanesulfonate, 5,6,7,8-tetrahydronaphthalen-2-yl methanesulfonate, 5,6,7,8-tetrahydronaphthalen-1-yl ethanesulfonate, 5,6,7,8-tetrahydronaphthalen-2-yl ethanesulfonate, 5,6,7,8-tetrahydronaphthalen-1-yl trifluoromethanesulfonate, 5,6,7,8-tetrahydronaphthalen-2-yl trifluoromethanesulfonate, 5,6,7,8-tetrahydronaphthalen-1-yl 2,2,2-trifluoroethanesulfonate, 5,6,7,8-tetrahydronaphthalen-2-yl 2,2,2-trifluoroethanesulfonate, 5,6,7,8-tetrahydronaphthalen-1-yl 4-methylbenzenesulfonate, 5,6,7,8-tetrahydronaphthalen-2-yl 4-methylbenzenesulfonate, etc.

Especially preferred examples of the sulfonate compound represented by the general formula (II) (general formula (IV)) or the general formula (III) (general formula (V)) include one or more selected from 2-cyclohexylphenyl methanesulfonate, 4-cyclohexylphenyl methanesulfonate, 2-cyclohexylphenyl ethanesulfonate, 5,6,7,8-tetrahydronaphthalen-1-yl methanesulfonate, 5,6,7,8-tetrahydronaphthalen-2-yl methanesulfonate. These specific compounds are preferred as especially excellent in the effect of improving the low-temperature property after high-temperature cycles.

The compounds represented by the general formula (II) are preferred to the compounds represented by the general formula (I) in that the former are more excellent than the latter in the effect of improving the low-temperature property after high-temperature cycles.

Though not always clear, the reason why the sulfonate compound represented by the general formula (II) (general formula (IV)) or the general formula (III) (general formula (V)) could improve the low-temperature property after high-temperature cycles would be as follows:

The sulfonate compound represented by the general formula (II) (general formula (IV)) or the general formula (III) (general formula (V)) forms a sulfur atom-containing surface film stable even at high temperatures, both on a positive electrode and a negative electrode through electrochemical decomposition, and therefore can inhibit the decomposition of the solvent in a nonaqueous electrolytic solution. The sulfur atom-containing surface film may rarely lower the lithium ion conductivity of a negative electrode, thereby facilitating deposition of Li metal; however, the sulfonate compound represented by the general formula (II) (general formula (IV)) or the general formula (III) (general formula (V)) further contains a cyclohexane ring, and is therefore oxidized on a positive electrode in an extremely minute amount to promote proton formation, and accordingly, it is considered that the Li metal deposition on a negative electrode could be thereby inhibited owing to the proton reduction. Consequently, it is considered that even after high-temperature cycles, the resistance of both the positive electrode and the negative electrode could hardly increase and therefore the load characteristics and the low-temperature property would hardly worsen even after high-temperature cycles.

The above-mentioned is not attained by other compounds of 4-phenylphenyl methanesulfonate having a benzene ring in place of the cyclohexane ring in the sulfonate compound, or 2-cyclohexylphenyl methylcarbonate having a methoxycarbonyloxy group in place of the methanesulfonyloxy group in the sulfonate compound; and it is known that the effect is specific to the compounds in the present invention having three of a cyclohexane ring, a benzene ring and a sulfonyloxy group.

[Content of Sulfonate Compound Represented by General Formulae (I) to (III)]

In the nonaqueous electrolytic solution of the present invention, when the content of the sulfonate compound represented by the general formulae (I) to (III) is at most 5% by mass, then there occur few risks of any excessive surface film formation on an electrode to worsen the electrochemical characteristics such as the low-temperature property and others after high-temperature cycles; and when the content is at least 0.01% by mass, the effect of protecting positive electrode and negative electrode may be sufficient and the effect of improving the low-temperature property after high-temperature cycles may be thereby enhanced. Accordingly, the content of the compound in the nonaqueous electrolytic solution is preferably at least 0.01% by mass, more preferably at least 0.5% by mass, even more preferably at least 1% by mass, and the uppermost limit of the content is preferably at most 10% by mass, more preferably at most 5% by mass, even more preferably at most 3% by mass.

[Nonaqueous Solvent]

The nonaqueous solvent for use in the nonaqueous electrolytic solution of the present invention includes cyclic carbonates, linear carbonates, linear esters, ethers, amides, phosphates, sulfolanes, lactones, nitriles, S=O bond-containing compounds, carboxylic acid anhydrides, aromatic compounds, etc.

The cyclic carbonates include ethylene carbonate (EC), propylene carbonate (PC), butylene carbonate (BC), 4-fluoro-1,3-dioxolan-2-one (FEC), trans or cis-4,5-difluoro-1,3-dioxolan-2-one (hereinafter the two are collectively called "DFEC"), vinylene carbonate (VC), vinylethylene carbonate (VEC), etc. Of those, preferred is use of at least one cyclic carbonate having a carbon-carbon double bond or a fluorine, as markedly enhancing the effect of improving the high-temperature cycle property and the low-temperature property after high-temperature cycles; and more preferred is use of both a cyclic carbonate having a carbon-carbon double bond and a cyclic carbonate having a fluorine. As the cyclic carbonate having a carbon-carbon double bond, preferred are VC, VEC; and as the cyclic carbonate having a fluorine, preferred are FEC, DFEC.

One type of the solvent may be used here; but use of two or more different types of the solvents as combined is preferred as further enhancing the effect of improving the high-temperature cycle property and the low-temperature property after high-temperature cycles; and use of three or more different types of solvents is more preferred. Preferred combinations of the cyclic carbonates include EC and PC; EC and VC; PC and VC; FEC and VC; FEC and EC, FEC and PC, FEC and DFEC; DFEC and EC; DFEC and PC; DFEC and VC; DFEC and VEC; EC, PC and VC; EC, FEC and PC; EC, FEC and VC; EC, VC and VEC; FEC, PC and VC; DFEC, EC and VC; DFEC, PC and VC; FEC, EC, PC and VC; DFEC, EC, PC and VC, etc. Of the above-mentioned combinations, more preferred are EC and VC; FEC and PC; DFEC and PC; EC, FEC and PC; EC, FEC and VC; EC, VC and VEC, etc.

Not specifically defined, the content of the cyclic carbonate is preferably within a range of from 10 to 40% by volume of the total volume of the nonaqueous solvent. When the content is at least 10% by volume, then the electroconductivity of the electrolytic solution may not lower, and therefore the increase in the internal resistance of batteries can be prevented; and when the content is at most 40% by volume, then the effect of improving the high-temperature cycle property and the low-temperature property after high-temperature cycles can be enhanced.

The linear carbonates include asymmetric linear carbonates such as methyl ethyl carbonate (MEC), methyl propyl carbonate (MPC), methyl isopropyl carbonate (MIPC), methyl butyl carbonate, ethyl propyl carbonate, etc.; and symmetric linear carbonates such as dimethyl carbonate (DMC), diethyl carbonate (DEC), dipropyl carbonate, dibutyl carbonate, etc.

Of those, the solvent preferably contains a linear carbonate having a methyl group, and more preferably contains at least one of DMC, MEC, MPC and MIPC, even more preferably at least one of DMC and MEC.

Also preferably, the solvent contains an asymmetric linear carbonate as the effect of improving the high-temperature cycle property and the low-temperature property after high-temperature cycles may be enhanced more, and more preferably the solvent contains both an asymmetric linear carbonate and a symmetric linear carbonate. Preferably, the proportion of the asymmetric linear carbonate in the linear carbonate is at least 50% by volume. As the asymmetric linear carbonate, preferred is one having a methyl group, and most preferred is MEC.

One type alone of these linear carbonates may be used here; however, combined use of two or more different types of such linear carbonates is preferred as further enhancing the above-mentioned effect.

Not specifically defined, the content of the linear carbonate is preferably within a range of from 60 to 90% by volume relative to the total volume of the nonaqueous solvent. When the content is at most 60% by volume, then the viscosity of the electrolytic solution would not increase; and when the content is at most 90% by volume, then the electroconductivity of the electrolytic solution would not lower and the electrochemical characteristics such as the high-temperature characteristics and others of batteries can be prevented from worsening. Accordingly, the content is preferably within the above-mentioned range.

The ratio of the cyclic carbonate and the linear carbonate is preferably such that the cyclic carbonate/linear carbonate (by volume) is from 10/90 to 40/60, more preferably from 15/85 to 35/65, even more preferably from 20/80 to 30/70, from the viewpoint of enhancing the effect of improving the high-temperature cycle property and the low-temperature property after high-temperature cycles and enhancing the effect of preventing the gas generation in charging and storage.

Preferred examples of the other nonaqueous solvents for use herein include linear esters such as methyl acetate, ethyl acetate, methyl propionate, methyl pivalate, butyl pivalate, hexyl pivalate, octylpivalate, dimethyl oxalate, ethyl methyl oxalate, diethyl oxalate, etc.; cyclic ethers such as tetrahydrofuran, 2-methyltetrahydrofuran, 1,3-dioxolane, 1,3-dioxane, 1,4-dioxane, etc.; linear ethers such as 1,2-dimethoxyethane, 1,2-diethoxyethane, 1,2-dibutoxyethane, etc.; amides such as dimethylformamide, etc.; phosphates such as trimethyl phosphate, tributyl phosphate, trioctyl phosphate, etc.; sulfones such as sulfolane, etc.; lactones such as γ-butyrolactone, γ-valerolactone, α-angelicalactone, etc.; nitriles such as acetonitrile, propionitrile, succinonitrile, glutaronitrile, adiponitrile, etc.; S=O bond-containing compounds selected from sultone compounds such as 1,3-butanesultone, 1,4-butanesultone, etc., cyclic sulfite compounds such as ethylene sulfite, hexahydrobenzo[1,3,2]dioxathiolan-2-oxide (this may be referred to also as 1,2-cyclohexanediol cyclic sulfite), 5-vinyl-hexahydro-1,3,2-benzodioxathiol-2-oxide, etc., disulfonic diester compounds such as 1,2-ethanediol dimethanesulfonate, 1,2-propanediol dimethanesulfonate, 1,4-butanediol dimethanesulfonate, 1,3-butanediol dimethanesulfonate, etc., vinylsulfone compounds such as divinyl sulfone, 1,2-bis(vinylsulfonyl)ethane, bis(2-vinylsulfonylethyl)ether, etc.; linear carboxylic acid anhydrides such as acetic anhydride, propionic anhydride, etc.; cyclic carboxylic acid anhydrides such as succinic anhydride, maleic anhydride, glutaric anhydride, itaconic anhydride, etc.; aromatic compounds such as cyclohexylbenzene, fluorocyclohexylbenzene compounds (1-fluoro-2-cyclohexylbenzene, 1-fluoro-3-cyclohexylbenzene, 1-fluoro-4-cyclohexylbenzene), aromatic compounds having a branched alkyl group such as tert-butylbenzene, tert-amylbenzene, 1-fluoro-4-tert-butylbenzene, etc., biphenyl, terphenyl (o-, m-, p-form), naphthalene, naphthalene derivatives such as 1,2,3,4-tetrahydronaphthalene, etc., diphenyl ether, fluorobenzene, difluorobenzene (o-, m-, p-form), 2,4-difluoroanisole, partially-hydrogenated terphenyls (1,2-dicyclohexylbenzene, 2-phenylbicyclohexyl, 1,2-diphenylcyclohexane, o-cyclohexylbiphenyl), etc.

Of the above-mentioned nonaqueous solvents, especially preferably, at least one or more selected from S=O bond-having compounds, carboxylic acid anhydrides and aromatic compounds are combined with the sulfonate compound represented by the general formulae (I) to (III), as enhancing the effect of improving the high-temperature cycle property and the low-temperature property after high-temperature cycles.

As the S=O bond-having compound, preferred are cyclic sulfite compounds; and as the carboxylic acid anhydride, preferred are cyclic carboxylic acid anhydrides. More preferred is at least one compound selected from ethylene sulfite, hexahydro[1,3,2]dioxathiolan-2-oxide, 5-vinyl-hexahydro-1,3,2-benzodioxathiol-2-oxide, and succinic anhydride.

As the aromatic compound, preferred are any of biphenyl derivatives, branched alkylene group-having aromatic compounds and naphthalene derivatives; and more preferred is at least one compound selected from biphenyl, o-terphenyl, cyclohexylbenzene, tert-butylbenzene, tert-amylbenzene, 1,2,3,4-tetrahydronaphthalene. Most preferred is cyclohexylbenzene.

Regarding the amount of the compound to be combined for use herein with the sulfonate compound represented by the general formula (I), when the amount is more than 5% by mass, then the high-temperature cycle property and the low-temperature property after high-temperature cycles may worsen; but when the amount is less than 0.05% by mass, then the effect of improving the characteristics may be insufficient. Accordingly, the content is preferably at least 0.05% by mass in the mass of the nonaqueous electrolytic solution, more preferably at least 0.5% by mass. The uppermost limit of the content is preferably at most 5% by mass, more preferably at most 3% by mass.

The above-mentioned nonaqueous solvents are used preferably as a mixture thereof for attaining the suitable physical properties. The combination includes, for example, a combination of a cyclic carbonate and a linear carbonate, a combination of a cyclic carbonate, a linear carbonate and a lactone, a combination of a cyclic carbonate, a linear carbonate and a linear ester, a combination of a cyclic carbonate, a linear carbonate and an ether, a combination of a cyclic carbonate, a linear carbonate and an S=O bond-having compound, etc.

Of those, use of a nonaqueous solvent comprising a combination of at least a cyclic carbonate and a linear carbonate is preferred as enhancing the effect of improving the high-temperature cycle property and the low-temperature property after high-temperature cycles. More concretely, there is mentioned a combination of one or more cyclic carbonates selected from EC, PC, VC, VEC and FEC, and one or more linear carbonates selected from DMC, MEC and DEC.

[Electrolyte Salt]

As the electrolyte salt for use in the present invention, preferably mentioned are the following lithium salts and onium salts.

(Lithium Salt)

The lithium salt includes inorganic lithium salts such as $LiPF_6$, $LiPO_2F_2$, $LiBF_4$, $LiClO_4$, etc.; linear fluoroalkyl group-having lithium salts such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiFF_3(C_2F_5)_3$, $LiPF_3(CF_3)_3$, $LiPF_3(iso-C_3F_7)_3$, $LiPF_5(iso-C_3F_7)$, etc.; cyclic fluoroalkylene chain-having lithium salts such as $(CF_2)_2(SO_2)_2NLi$, $(CF_2)_3(SO_2)_2NLi$, etc.; and lithium salts with an oxalate complex as the anion therein, such as lithium bis[oxalate-O,O']borate, lithium difluoro[oxalate-O,O']borate, etc. Of those, at least one selected from $LiPF_6$, $LiBF_4$, $LiN(SO_2CF_3)_2$ and $LiN(SO_2C_2F_5)_2$ is especially preferred as the electrolyte salt. One or more of these electrolyte salts may be used here either singly or as combined.

A preferred combination of these electrolyte salts comprises $LiPF_6$ and contains a lithium salt having a nitrogen atom or a boron atom. The lithium salt having a nitrogen atom or a boron atom includes a combination containing at least one selected from $LiBF_4$, $LiN(SO_2CF_3)_2$ and $LiN(SO_2C_2F_5)_2$. Preferred are a combination of $LiPF_6$ and $LiBF_4$, a combination of $LiPF_6$ and $LiN(SO_2CF_3)_2$, a combination of $LiPF_6$ and $LiN(SO_2C_2F_5)_2$, etc. Regarding the ratio (by mol) of $LiPF_6$/[$LiBF_4$ or $LiN(SO_2CF_3)_2$ or $LiN(SO_2C_2F_5)_2$], when the ratio of $LiPF_6$ is lower than 70/30, and when the ratio of $LiPF_6$ is higher than 99/1, the effect of improving the high-temperature cycle property and inhibiting gas generation in charging and storage may lower. Accordingly, the ratio (by mol) of $LiPF_6$/[$LiBF_4$ or $LiN(SO_2CF_3)_2$ or $LiN(SO_2C_2F_5)_2$] is preferably within a range of from 70/30 to 99/1, more preferably within a range of from 80/20 to 98/2. When the electrolyte salts are used as the combination thereof falling within the above-mentioned range, then the effect of improving the high-temperature cycle property and the low-temperature property after high-temperature cycles can be further enhanced.

The electrolyte salts may be mixed in any desired ratio. When combined with $LiPF_6$, the proportion (molar fraction) of the other electrolyte salts except $LiBF_4$, $LiN(SO_2CF_3)_2$ and $LiN(SO_2C_2F_5)_2$ to all the electrolyte salts may be at least 0.01%, as sufficiently effective for improving the high-temperature cycle property and the low-temperature property after high-temperature cycles; and the proportion may also be at most 45% as free from the risk of worsening the high-temperature cycle property. Accordingly, the proportion (molar fraction) is preferably from 0.01 to 45%, more preferably from 0.03 to 20%, even more preferably from 0.05 to 10%, most preferably from 0.05 to 5%.

The concentration of all these electrolyte salts dissolved is, in general, preferably at least 0.3 M relative to the above-mentioned nonaqueous solvent, more preferably at least 0.5 M, most preferably at least 0.7 M. The uppermost limit of the concentration is preferably at most 2.5 M, more preferably at most 2.0 M, even more preferably at most 1.5 M, most preferably at most 1.2 M.

(Onium Salt)

Preferred examples of the onium salt are various salts of a combination of an onium cation and an anion mentioned below.

Preferred examples of the onium cation include a tetramethylammonium cation, an ethyltrimethylammonium cation, a diethyldimethylammonium cation, a triethylmethylammonium cation, a tetraethylammonium cation, an N,N-dimethylpyrrolidinium cation, an N-ethyl-N-methylpyrrolidinium cation, an N,N-diethylpyrrolidinium cation, a spiro-(N,N')-bipyrrolidinium cation, an N,N'-dimethylimidazolinium cation, an N-ethyl-N'-methylimidazolinium cation, an N,N'-diethylimidazolinium cation, an N,N'-dimethylimidazolinium cation, an N-ethyl-N'-methylimidazolinium cation, an N,N'-diethylimidazolinium cation, etc.

Preferred examples of the anion include a $PF_6$ anion, a $BF_4$ anion, a $ClO_4$ anion, an $AsF_6$ anion, an $CF_3SO_3$ anion, an $N(CF_3SO_2)_2$ anion, an $N(C_2F_5SO_2)_2$ anion, etc.

[Production of Nonaqueous Electrolytic Solution]

The nonaqueous electrolytic solution of the present invention may be produced, for example, by mixing the above-mentioned nonaqueous solvents, adding thereto the above-mentioned electrolyte salt, and further adding thereto the sulfonate compound represented by the above-mentioned general formulae (I) to (III) to be in an amount of from 0.01 to 10% by mass in the nonaqueous electrolytic solution.

Preferably, the nonaqueous solvent to be used and the compound to be added to the electrolytic solution are previously purified to reduce as much as possible the content of impurities therein within a range not extremely detracting from the producibility.

The nonaqueous electrolytic solution of the present invention can be used in the first to fourth electrochemical devices mentioned below, in which as the nonaqueous electrolyte, not only a liquid one but also a gelled one may be used. Further, the nonaqueous electrolytic solution of the present invention can also be used for solid polymer electrolytes. Especially preferably, the solution is used in the first electrochemical device where a lithium salt is used as the electrolyte salt (that is, for lithium batteries), or in the fourth electrochemical device (that is, for lithium ion capacitors); and more preferably, the solution is used for lithium batteries; and most suitably, the solution is used for lithium secondary batteries.

[First Electrochemical Device (Lithium Battery)]

The lithium battery of the present invention means a generic name for a lithium primary battery and a lithium secondary battery. The lithium battery of the present invention comprises a positive electrode, a negative electrode, and the above-mentioned nonaqueous electrolytic solution of an electrolyte salt dissolved in a nonaqueous solvent. The other constitutive members such as the positive electrode, the negative electrode and others than the nonaqueous electrolytic solution are not specifically defined for use herein.

For example, as the positive electrode active material for lithium secondary batteries, usable is a composite metal oxide of lithium and one or more selected from cobalt, manganese and nickel. One alone or two or more of these positive electrode active materials may be used here either singly or as combined.

The lithium complex metal oxide includes, for example, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, $LiCo_{0.98}Mg_{0.02}O_2$, etc. Also usable here is a combination of $LiCoO_2$ and $LiMn_2O_4$, a combination of $LiCoO_2$ and $LiNiO_2$, or a combination of $LiMn_2O_4$ and $LiNiO_2$.

For improving the safety of the batteries in overcharging and the cycle property, or for enabling the use thereof at a charge potential of 4.3 V or more, a part of the lithium complex metal oxide may be substituted with any other element. For example, a part of cobalt, manganese and nickel may be substituted with at least one or more elements of Sn, Mg, Fe, Ti, Al, Zr, Cr, V, Ga, Zn, Cu, Bi, Mo, La, etc.; or a part of O may be substituted with S or F; or the oxide may be coated with a compound containing any of such other elements.

Of those, preferred are lithium complex metal oxides such as $LiCoO_2$, $LiMn_2O_4$ and $LiNiO_2$, with which the charge potential of the positive electrode in a fully-charged state could be used at 4.3 V or more based on Li; and more preferred are lithium complex metal oxides such as $LiCo_{1-x}M_xO_2$ (where M is at least one or more elements selected from Sn, Mg, Fe, Ti, Al, Zr, Cr, V, Ga, Zn and Cu; $0.001 \leq x \leq 0.05$), $LiCo_{1/3}Ni_{1/3}Mn_{1/3}O_2$, $LiNi_{1/2}Mn_{3/2}O_4$ and the like capable of being used at 4.4 V or more. When the lithium complex metal oxide capable of being used at a higher charged voltage is used, then the effect of improving the high-temperature cycle property and the low-temperature property after high-temperature cycles may often worsen owing to the reaction of the oxide with the electrolytic solution in charging; however, in the lithium secondary battery of the present invention, the electrochemical characteristics can be prevented from worsening.

Further, lithium-containing olivine-type phosphates are also usable as the positive electrode active material. Especially preferred are lithium-containing olivine-type phosphates containing at least one or more selected from Fe, Co, Ni and Mn. Their specific examples include $LiFePO_4$, $LiCoPO_4$, $LiNiPO_4$, $LiMnPO_4$, etc.

The lithium-containing olivine-type phosphates may be partly substituted with any other element. For example, apart of iron, cobalt, nickel and manganese therein may be substituted with one or more elements selected from Co, Mn, Ni, Mg, Al, B, Ti, V, Nb, Cu, Zn, Mo, Ca, Sr, W and Zr; or the phosphates may be coated with a compound containing any of these other elements or with a carbon material. Of those, preferred are $LiFePO_4$ and $LiMnPO_4$.

The lithium-containing olivine-type phosphate may be combined with, for example, the above-mentioned positive electrode active material.

For the positive electrode for lithium primary batteries, there are mentioned oxides or chalcogen compounds of one or more metal elements such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, etc.; sulfur compounds such as $SO_2$, $SOCl_2$, etc.; carbon fluorides (fluorographite) represented by a general formula $(CF_x)_n$, etc. Of those, preferred are $MnO_2$, $V_2O_5$, fluorographite, etc.

In case where an element Ni is contained in the positive electrode, impurities such as LiOH in the positive electrode active material may increase so that the decomposition of the electrolytic solution may be promoted. In such a case, the nonaqueous electrolytic solution of the present invention is preferably used, since the effect thereof of improving the high-temperature cycle property and the low-temperature property after high-temperature cycles can be more remarkable. In particular, when the Ni atom concentration in the positive electrode active material is from 5 to 25 atomic %, the advantage of the nonaqueous electrolytic solution of the present invention is more remarkable, and even more preferably, the Ni atomic concentration is from 8 to 21 atomic %.

Not specifically defined, the electroconductive agent of the positive electrode may be any electron-conductive material not undergoing chemical change. For example, it includes graphites such as natural graphite (flaky graphite, etc.), artificial graphite, etc.; carbon blacks such as acetylene black, Ketjen black, channel black, furnace black, lamp black, thermal black, etc. Graphites and carbon blacks may be combined suitably. The amount of the electroconductive agent to be added to the positive electrode mixture is preferably from 1 to 10% by mass, more preferably from 2 to 5% by mass.

The positive electrode may be formed by mixing the above-mentioned positive electrode active material with an electroconductive agent such as acetylene black, carbon black or the like, and with a binder such as polytetrafluoroethylene (PTFE), polyvinylidene fluoride (PVDF), styrene/butadiene copolymer (SBR), acrylonitrile/butadiene copolymer (NBR), carboxymethyl cellulose (CMC), ethylene/propylene/diene terpolymer or the like, then adding thereto a high-boiling-point solvent such as 1-methyl-2-pyrrolidone or the like, and kneading them to give a positive electrode mixture, thereafter applying the positive electrode mixture onto an aluminium foil or a stainless lath plate or the like serving as a collector, and drying and shaping it under pressure, and then heat-treating it in vacuum at a temperature of from 50° C. to 250° C. or so for about 2 hours.

The density of the part except the collector of the positive electrode may be generally at least 1.5 g/cm$^3$, and for further increasing the capacity of the battery, the density is preferably at least 2 g/cm$^3$, more preferably at least 3 g/cm$^3$, even more preferably at least 3.6 g/cm$^3$. The upper limit is preferably at most 4 g/cm$^3$.

As the negative electrode active material, usable are one or more of lithium metal, lithium alloys, carbon materials (graphites such as artificial graphite, natural graphite, etc.) capable of absorbing and releasing lithium, metal compounds capable of absorbing and releasing lithium and the like, either singly or as combined.

As the carbon material capable of absorbing and releasing lithium, preferred are graphitizable carbon, non-graphitiz-able carbon of which the (002) plane spacing is at least 0.37 nm, graphite of which the (002) plane spacing is at most 0.34 nm, etc.

Of those, preferred is use of high-crystalline carbon materials such as artificial graphite, natural graphite and the like, in view of the ability thereof to absorb and release lithium ions, and more preferred is use of a carbon material having a graphite-type crystal structure where the (002) plane spacing ($d_{002}$) is at most 0.340 nm (nanometers), especially from 0.335 to 0.337 nm.

When artificial graphite particles having a bulky structure where plural flattened graphite fine particles aggregate or bond together non-parallel to each other, or graphite particles produced through spheroidizing treatment comprising repeatedly imparting mechanical action such as compression force, friction force, shear force or the like to, for example, flaky natural graphite particles are used, and when the ratio of the peak intensity I (110) of the (110) plane of the graphite crystal obtained in X-ray diffractiometry of a negative electrode sheet as shaped by pressing so that the density of the part except the collector of the negative electrode could be 1.5 g/cm$^3$, to the peak intensity I (004) of the (004) plane thereof, I(110)/I(004) is at least 0.01, then the Li ion absorption and release sites would be clogged through decomposition of the electrolytic solution in high-temperature cycles so that the low-temperature property after high-temperature cycles would worsen; however, when the electrolytic solution of the present invention is used, the above-mentioned effect can be remarkably enhanced, and therefore use of the electrolytic solution of the present invention is favorable in this point. More preferably, the ratio is at least 0.05, even more preferably at least 0.1. On the other hand, when too much processed, the crystallinity may worsen and the discharge capacity of batteries may lower; and therefore, the upper limit is at most 0.5, more preferably at most 0.3.

When a high-crystalline carbon material used, it may readily react with a nonaqueous electrolytic solution in charging, and therefore the electrochemical characteristics such as the high-temperature cycle property and the low-temperature property after high-temperature cycles may worsen; however, in the lithium secondary battery of the present invention, the reaction of the material with the nonaqueous electrolytic solution can be prevented. In addition, when the high-crystalline carbon material is coated with a low-crystalline carbon material, it is favorable since the decomposition of the non-aqueous electrolytic solution by the material can be prevented more effectively.

The metal compound capable of absorbing and releasing lithium, serving as a negative electrode active material, includes compounds containing at least one metal element of Si, Ge, Sn, Pb, P, Sb, Bi, Al, Ga, In, Ti, Mn, Fe, Co, Ni, Cu, Zn, Ag, Mg, Sr, Ba, etc. These metal compounds may have any morphology of simple substances, alloys, oxides, nitrides, sulfides, borides, alloys with lithium or the like; but preferred are any of simple substances, alloys, oxides and alloys with lithium, as capable of increasing the capacity of batteries. Above all, more preferred are those containing at least one element selected from Si, Ge and Sn, and even more preferred are those containing at least one element selected from Si and Sn, as capable of increasing the capacity of batteries.

The negative electrode may be formed, using the same electroconductive agent, binder and high-boiling point solvent as in the formation of the above-mentioned positive electrode. These are mixed and kneaded to give a negative electrode mixture, then the negative electrode mixture is applied onto a copper foil or the like serving as a collector, then dried and shaped under pressure, and thereafter heat-treated in vacuum at a temperature of from 50° C. to 250° C. or so for about 2 hours.

As the negative electrode active material for lithium primary batteries, usable are lithium metal or lithium alloys.

In case where graphite is used as the negative electrode active material, the density of the part except the collector of the negative electrode may be generally at least 1.4 g/cm$^3$, and for further increasing the capacity of batteries, the density is preferably at least 1.6 g/cm$^3$, more preferably at least 1.7 g/cm$^3$. The upper limit is preferably at most 2 g/cm$^3$.

The structure of the lithium battery is not specifically defined. The battery may be a coin-shaped battery, a cylindrical battery, a square-shaped battery, or a laminate-type battery, each having a single-layered or multi-layered separator.

The separator for the battery is not specifically defined, for which usable is a single-layer or laminate porous film of polyolefin such as polypropylene, polyethylene or the like, as well as a woven fabric, a nonwoven fabric, etc.

The lithium secondary battery of the present invention is excellent in the effect of improving the high-temperature cycle property and the low-temperature property after high-temperature cycles even when the charging final voltage is 4.2 V or more, especially 4.3 v or more, and further, the characteristics of the battery are still good even at 4.4 V or more. The discharging final voltage could be generally 2.8 V or more, further 2.5 V or more; however, in the lithium secondary battery of the present invention, the voltage may be 2.0 V or more. The current value is not specifically defined. In general, the value may fall within a range of from 0.1 to 3 C. The lithium battery of the present invention can be charged/discharged at −40 to 100° C., preferably at 0 to 80° C.

In the present invention, as a countermeasure against the increase in the internal pressure of the lithium battery, there may be employed a method of providing a safety valve in the battery cap or a method of forming a cutout in the battery component such as the battery can, the gasket or the like. In addition, as a safety countermeasure against overcharging, a current breaker capable of detecting the internal pressure of the battery to cut off the current may be provided in the battery cap.

[Second Electrochemical Device (Electric Double-Layer Capacitor)]

This is an electrochemical device that stores energy by utilizing the electric double layer capacitance in the interface between the electrolytic solution and the electrode therein. One example of the present invention is an electric double layer capacitor. The most typical electrode active material to be used in the electrochemical device is active carbon. The double layer capacitance increases almost in proportion to the surface area.

[Third Electrochemical Device]

This is an electrochemical device that stores energy by utilizing the doping/dedoping reaction of the electrode therein. As the electrode active material for use in the electrochemical device, there may be mentioned metal oxides such as ruthenium oxide, iridium oxide, tungsten oxide, molybdenum oxide, copper oxide, etc.; n-conjugated polymers such as polyacene, polythiophene derivatives, etc. The capacitor that uses the electrode active material of the type enables energy storage along with the doping/dedoping reaction at the electrode therein.

[Fourth Electrochemical Device (Lithium Ion Capacitor)]

This is an electrochemical device that stores energy by utilizing the lithium ion intercalation into the carbon material such as graphite or the like of the negative electrode therein. This may be referred to as a lithium ion capacitor (LIC). As the positive electrode, for example, there may be mentioned one that utilizes the electric double layer between the active carbon electrode and the electrolytic solution therein, or one that utilizes the doping/dedoping reaction of the π-conjugated polymer electrode therein. The electrolytic solution contains at least a lithium salt such as $LiPF_6$ or the like.

EXAMPLES

Production Examples for the novel compounds of the present invention, and Examples of the electrolytic solution using the compound are shown below. However, the invention is not limited to these Examples.

Production Example 1 Production of 2-tert-butyl-4-methoxyphenyl methanesulfonate 15.0 g (83.2 mmol) of 4-hydroxy-3-tert-butylanisole and 10.5 g (104 mmol) of triethylamine were dissolved in 250 ml of dimethyl carbonate (solvent), and 11.9 g (104 mmol) of methanesulfonyl chloride was dropwise added thereto, taking 25 minutes and controlling the inner temperature at 5° C. or lower. After the addition, this was stirred at 25° C. for 1.5 hours, the reaction mixture was poured into an aqueous saturated sodium bicarbonate solution, the aqueous layer was separated, the organic layer was washed twice with water, and then the organic layer was separated and concentrated. The concentrate was purified through distillation (139° C./32 pa) to give 16.3 g of 2-tert-butyl-4-methoxyphenyl methanesulfonate (yield, 76%).

The obtained 2-tert-butyl-4-methoxyphenyl methanesulfonate was analyzed through $^1$H-NMR (measuring machine: JEOL's AL300) and mass spectrometry (measuring machine: Hitachi's M80B) to identify the structure thereof.

(1) 1H-NMR (300 MHz, $CDCl_3$): δ=7.45 (d, J=9.0 Hz, 1H), 6.95 (d, J=3.2 Hz, 1H), 6.71 (dd, J=9.0 Hz×3.2 Hz, 1H), 3.79 (s, 3H), 3.21 (s, 3H), 1.39 (s, 9H).

(2) Mass Spectrometry: MS (EI)m/z (%)=258(19) [M+] 179(100), 151(20), 139(18), 119(13), 91(13), 76(11), 41(10).

Examples I-1 to I-11, Comparative Examples I-1 to I-3

[Production of Lithium Ion Secondary Battery]

94% by mass of $LiNi_{1/3}Mn_{1/3}CO_{1/3}O_2$ (positive electrode active material) and 3% by mass of acetylene black (electroconductive agent) were mixed, and added to and mixed in a solution previously prepared by dissolving 3% by mass of polyvinylidene fluoride (binder) in 1-methyl-2-pyrrolidone, thereby preparing a positive electrode mixture paste. The positive electrode mixture paste was applied on both surfaces of an aluminium foil (collector), then dried, processed under pressure and blanked into a predetermined size, thereby producing a positive electrode sheet. The density of the part of the positive electrode except the collector was 3.6 g/cm$^3$. On the other hand, 95% by mass of artificial graphite ($d_{002}$=0.335 nm, negative electrode active material) was added to and mixed in a solution previously prepared by dissolving 5% by mass of polyvinylidene fluoride (binder) in 1-methyl-2-pyrrolidone, thereby preparing a negative electrode mixture paste. The negative electrode mixture paste was applied onto one surface of a copper foil (collector), dried, processed under pressure and blanked into a predetermined size, thereby producing a negative electrode sheet. The density of the part of the negative electrode except the collector was 1.7 g/cm$^3$. The positive electrode sheet, a porous polyethylene film separator and the negative electrode sheet were laminated in that order, and a nonaqueous electrolytic solution having the composition shown in Table 1 was added thereto to construct a 2032-type coin battery.

[Evaluation of Low-Temperature Property after High-Temperature Cycle Test]

(Initial Discharge Capacity)

In a thermostat chamber kept at 25° C., the coin battery fabricated according to the above-mentioned method was charged up to a final voltage of 4.1 V for 3 hours with a constant current of 1 C and under a constant voltage, then the temperature of the thermostat chamber was lowered to 0° C., and the battery was discharged under a constant current of 1 C to a final voltage of 2.75 V. The initial discharge capacity at 0° C. was measured.

(High-Temperature Cycle Test)

Next, in a thermostat chamber at 60° C., the coin battery was charged up to a final voltage of 4.1 V for 3 hours with a constant current of 1 C and under a constant voltage, and then discharged under a constant current of 1 C to a final voltage of 2.75 V. This is one cycle. The coin battery was repeatedly charged/discharged for a total of 100 cycles.

(Discharge Capacity after High-Temperature Cycles)

Further after that, the discharge capacity at 0° C. after the high-temperature cycles was measured in the same manner as that for the measurement of the initial discharge capacity.

(Low-Temperature Property after High-Temperature Cycle Test)

The low-temperature property after the high-temperature cycles were determined based on the 0° C. discharge capacity mentioned below.

0° C. Discharge Capacity Retention Rate after high-temperature cycles (%)=(discharge capacity at 0° C. after high-temperature cycles/initial discharge capacity at 0° C.)×100.

The condition in producing the batteries and the battery characteristics are shown in Table 1.

TABLE 1

| | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example I-1 | 1M LiPF6 EC/MEC/DMC (30/35/35) | 4-methoxyphenyl methanesulfonate | 0.1 | 65 |
| Example I-2 | 1M LiPF6 EC/MEC/DMC (30/35/35) | 4-methoxyphenyl methanesulfonate | 2 | 75 |

TABLE 1-continued

|  | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example I-3 | 1M LiPF6 EC/MEC/DMC (30/35/35) | 4-methoxyphenyl methanesulfonate | 4 | 74 |
| Example I-4 | 1M LiPF6 EC/MEC/DMC (30/35/35) | 4-methoxyphenyl methanesulfonate | 7 | 72 |
| Example I-5 | 1M LiPF6 EC/MEC/DMC (30/35/35) | 2-methoxyphenyl methanesulfonate | 2 | 74 |
| Example I-6 | 1M LiPF6 EC/MEC/DMC (30/35/35) | 2,6-dimethoxyphenyl methanesulfonate | 2 | 78 |
| Example I-7 | 1M LiPF6 EC/MEC/DMC (30/35/35) | 3-methoxy-1,2-phenylene dimethanesulfonate | 2 | 76 |
| Example I-8 | 1M LiPF6 EC/MEC/DMC (30/35/35) | 2-fluoro-4-methoxyphenyl methanesulfonate | 2 | 71 |
| Example I-9 | 1M LiPF6 EC/MEC/DMC (30/35/35) | 2-tert-butyl-4-methoxyphenyl methanesulfonate | 2 | 79 |
| Example I-10 | 0.95M LiPF6 + 0.05M LiN(SO2CF3)2 EC/VC/MEC/DMC (23/2/50/25) + 5-vinyl-hexahydro-1,3,2-benzodioxathiol-2-oxide: 0.5 wt % | 4-methoxyphenyl methanesulfonate | 2 | 82 |
| Example I-11 | 1M LiPF6 EC/VC/DFEC/MEC/DMC (20/2/3/50/25) + succinic anhydride; 1 wt % | 4-methoxyphenyl methanesulfonate | 2 | 81 |
| Comparative Example I-1 | 1M LiPF6 EC/MEC/DMC (30/35/35) | no | — | 54 |
| Comparative Example I-2 | 1M LiPF6 EC/MEC/DMC (30/35/35) | 1,2-dimethoxybenzene | 2 | 51 |
| Comparative Example I-3 | 1M LiPF6 EC/MEC/DMC (30/35/35) | 1,4-phenylene dimethanesulfonate | 2 | 56 |

Example I-12, Comparative Example I-4

A negative electrode sheet was produced, using silicon (negative electrode active material) in place of the negative electrode active material used in Example I-2 and Comparative Example I-1. Precisely, 80% by mass of silicon (simple substance) and 15% by mass of acetylene black (electroconductive agent) were mixed, and added to and mixed in a solution previously prepared by dissolving 5% by mass of polyvinylidene fluoride (binder) in 1-methyl-2-pyrrolidone, thereby preparing a negative electrode mixture paste. The negative electrode mixture paste was applied onto a copper foil (collector), dried, processed under pressure, and blanked into a predetermined size, thereby producing a negative electrode sheet. Coin batteries were produced and evaluated in the same manner as in Example I-2 and Comparative Example I-1, except that the negative electrode sheet produced herein was used. The results are shown in Table 2.

Example I-13, Comparative Example I-5

A positive electrode sheet was produced by changing the positive electrode active material used in Example I-2 and Comparative Example I-1 to LiFePO4 (positive electrode active material). Concretely, 90% by mass of LiFePO4 and 5% by mass of acetylene black (electroconductive agent) were mixed, and added to and mixed in a solution previously prepared by dissolving 5% by mass of polyvinylidene fluoride (binder) in 1-methyl-2-pyrrolidone, thereby preparing a positive electrode mixture paste. The positive electrode mixture paste was applied onto an aluminium foil (collector), dried, processed under pressure and blanked into a predetermined size, thereby producing a positive electrode sheet. Coin batteries were produced and evaluated in the same manner as in Example I-2 and Comparative Example I-1, except that the positive electrode sheet thus produced herein was used and that the charging final voltage in evaluation of the cycle property and in evaluation of the gas generation amount was changed to 3.6 V and the discharging final voltage was changed to 2.0 V. The results are shown in Table 3.

TABLE 2

|  | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example I-12 | 1M LiPF6 EC/MEC/DMC (30/35/35) | 4-methoxyphenyl methanesulfonate | 2 | 81 |
| Comparative Example I-4 | 1M LiPF6 EC/MEC/DMC (30/35/35) | no | 2 | 69 |

TABLE 3

| | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example I-13 | 1M LiPF6 EC/MEC/DMC (30/35/35) | 4-methoxyphenyl methanesulfonate | 2 | 53 |
| Comparative Example I-5 | 1M LiPF6 EC/MEC/DMC (30/35/35) | no | 2 | 12 |

The lithium secondary batteries of Examples I-1 to I-11 were all remarkably bettered in point of the effect thereof of enhancing the low-temperature property after high-temperature cycles, as compared with the lithium secondary battery of Comparative Example I-1 in which the alkoxyphenyl alkanesulfonate compound was not added, the lithium secondary battery of Comparative Example I-2 in which 1,2-dimethoxybenzene having two and the same alkoxy groups alone was added, the lithium secondary battery of Comparative Example I-3 in which 1,4-phenylene dimethanesulfonate having two and the same alkanesulfonyloxy groups alone was added. From the above, it has been clarified that the effect of the present invention is specific to the compound having two and different substituents of a sulfonyloxy group and an alkoxy group on one benzene ring therein.

In addition, from comparison between Example I-12 and Comparative Example I-4, and from comparison between Example I-13 and Comparative Example I-5, the same effect is seen in the case where a lithium-containing olivine-type iron phosphate was used as the positive electrode, and in the case where Si was used as the negative electrode. Accordingly, it is obvious that the effect of the invention does not depend on any specific positive electrode or negative electrode.

Examples II-1 to II-9, Comparative Examples II-1 to II-3

[Production of Lithium Ion Secondary Battery]
94% by mass of $LiNi_{1/3}Mn_{1/3}CO_{1/3}O_2$ (positive electrode active material) and 3% by mass of acetylene black (electroconductive agent) were mixed, and added to and mixed in a solution previously prepared by dissolving 3% by mass of polyvinylidene fluoride (binder) in 1-methyl-2-pyrrolidone, thereby preparing a positive electrode mixture paste. The positive electrode mixture paste was applied on one surface of an aluminium foil (collector), then dried, processed under pressure and blanked into a predetermined size, thereby producing a positive electrode sheet. The density of the part of the positive electrode except the collector was 3.4 g/cm³. On the other hand, 95% by mass of artificial graphite ($d_{002}$=0.335 nm, negative electrode active material) coated with a low-crystalline carbon material was added to and mixed in a solution previously prepared by dissolving 5% by mass of polyvinylidene fluoride (binder) in 1-methyl-2-pyrrolidone, thereby preparing a negative electrode mixture paste. The negative electrode mixture paste was applied onto one surface of a copper foil (collector), dried, processed under pressure and blanked into a predetermined size, thereby producing a negative electrode sheet. The density of the part of the negative electrode except the collector was 1.5 g/cm³. Analyzed through X-ray diffractiometry, I(110)/I(004) of the electrode sheet was 0.1. The positive electrode sheet, a porous polyethylene film separator and the negative electrode sheet were laminated in that order, and a nonaqueous electrolytic solution having the composition shown in Table 1 was added thereto to construct a 2032-type coin battery.

In the same manner as in Example I, the batteries were evaluated for the low-temperature property thereof after high-temperature cycle test.

The condition in producing the batteries and the battery characteristics are shown in Table 4.

TABLE 4

| | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example II-1 | 1M LiPF6 EC/MEC/DMC (30/35/35) | 4-cyclohexylphenyl methanesulfonate | 0.1 | 71 |
| Example II-2 | 1M LiPF6 EC/MEC/DMC (30/35/35) | 4-cyclohexylphenyl methanesulfonate | 2 | 81 |
| Example II-3 | 1M LiPF6 EC/MEC/DMC (30/35/35) | 4-cyclohexylphenyl methanesulfonate | 7 | 78 |
| Example II-4 | 1M LiPF6 EC/MEC/DMC (30/35/35) | 2-cyclohexylphenyl methanesulfonate | 2 | 79 |
| Example II-5 | 1M LiPF6 EC/MEC/DMC (30/35/35) | 3-cyclohexylphenyl methanesulfonate | 2 | 78 |
| Example II-6 | 1M LiPF6 EC/MEC/DMC (30/35/35) | 5,6,7,8-tetrahydronaphthalen-2-yl methanesulfonate | 2 | 77 |
| Example II-7 | 0.95M LiPF6 + 0.05M LiBF4 EC/MEC/DMC (30/35/35) | 4-cyclohexylphenyl methanesulfonate | 2 | 83 |
| Example II-8 | 1M LiPF6 EC/VC/FEC/MEC/DMC (27/2/1/35/35) | 4-cyclohexylphenyl methanesulfonate | 2 | 84 |
| Example II-9 | 1M LiPF6 EC/MEC/DMC(30/35/35) + cyclohexylbenzene: 2 wt % | 4-cyclohexylphenyl methanesulfonate | 2 | 85 |
| Comparative Example II-1 | 1M LiPF6 EC/MEC/DMC (30/35/35) | no | — | 62 |

TABLE 4-continued

|  | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Comparative Example II-2 | 1M LiPF6 EC/MEC/DMC (30/35/35) | 4-phenylphenyl methanesulfonate | 2 | 65 |
| Comparative Example II-3 | 1M LiPF6 EC/MEC/DMC (30/35/35) | 2-cyclohexylphenyl methylcarbonate | 2 | 60 |

Example II-10, Comparative Example II-4

A negative electrode sheet was produced, using silicon (negative electrode active material) in place of the negative electrode active material used in Example II-2 and Comparative Example II-1. Precisely, 80% by mass of silicon (simple substance) and 15% by mass of acetylene black (electroconductive agent) were mixed, and added to and mixed in a solution previously prepared by dissolving 5% by mass of polyvinylidene fluoride (binder) in 1-methyl-2-pyrrolidone, thereby preparing a negative electrode mixture paste. The negative electrode mixture paste was applied onto a copper foil (collector), dried, processed under pressure, and blanked into a predetermined size, thereby producing a negative electrode sheet. Coin batteries were produced and evaluated in the same manner as in Example II-2 and Comparative Example II-1, except that the negative electrode sheet was produced as herein. The results are shown in Table 5.

TABLE 5

|  | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example II-10 | 1M LiPF6 EC/MEC/DMC (30/35/35) | 4-cyclohexylphenyl methanesulfonate | 2 | 61 |
| Comparative Example II-4 | 1M LiPF6 EC/MEC/DMC (30/35/35) | no | 2 | 25 |

Example II-11, Comparative Example II-5

A positive electrode sheet was produced by changing the positive electrode active material used in Example II-2 and Comparative Example II-1 to LiFePO$_4$ coated with amorphous carbon (positive electrode active material). Concretely, 90% by mass of LiFePO$_4$ coated with amorphous carbon and 5% by mass of acetylene black (electroconductive agent) were mixed, and added to and mixed in a solution previously prepared by dissolving 5% by mass of polyvinylidene fluoride (binder) in 1-methyl-2-pyrrolidone, thereby preparing a positive electrode mixture paste. The positive electrode mixture paste was applied onto an aluminium foil (collector), dried, processed under pressure and blanked into a predetermined size, thereby producing a positive electrode sheet. Coin batteries were produced and evaluated in the same manner as in Example II-2 and Comparative Example II-1, except that the positive electrode sheet thus produced herein was used and that the charging final voltage in evaluation of the low-temperature property after high-temperature cycles was changed to 3.6 V and the discharging final voltage was changed to 2.0 V. The results are shown in Table 6.

TABLE 6

|  | Composition of Electrolyte Salt Composition of Nonaqueous Electrolytic Solution (ratio by volume of solvents) | Compound | Amount Added (content in nonaqueous electrolytic solution) (wt %) | 0° C. Discharge Capacity Retention Rate after high-temperature cycles (%) |
|---|---|---|---|---|
| Example II-11 | 1M LiPF6 EC/MEC/DMC (30/35/35) | 4-cyclohexylphenyl methanesulfonate | 2 | 86 |
| Comparative Example II-5 | 1M LiPF6 EC/MEC/DMC (30/35/35) | no | 2 | 75 |

The lithium secondary batteries of Examples II-1 to II-9 were all remarkably bettered in point of the effect thereof of enhancing the low-temperature property after high-temperature cycles, as compared with the lithium secondary battery of Comparative Example II-1 in which the alkanesulfonyloxybenzene compound was not added, the lithium secondary battery of Comparative Example II-2 in which 4-phenylphenyl methanesulfonate having a benzene ring in place of the cyclohexane ring of the alkanesulfonyloxybenzene compound in Example II-1 was added, and the lithium secondary battery of Comparative Example 3 in which 2-cyclohexylphenyl methylcarbonate using a methoxycarbonyloxy group in place of the methanesulfonyloxy group of the alkanesulfonyloxybenzene compound in Example II-4 was added. From the above, it has been clarified that the effect of the present invention is specific to the compound having three of a cyclohexane ring, a benzene ring and an alkanesulfonyloxy group therein.

In addition, from comparison between Example II-10 and Comparative Example II-4, and from comparison between Example II-11 and Comparative Example II-5, the same effect is seen in the case where a lithium-containing olivine-type iron phosphate was used as the positive electrode, and in the case where Si was used as the negative electrode. Accordingly, it is obvious that the effect of the invention does not depend on any specific positive electrode or negative electrode.

Further, the nonaqueous electrolytic solution of the present invention has the effect of improving the low-temperature discharge characteristics of lithium primary batteries after storage at high temperatures.

Industrial Applicability

Using the nonaqueous electrolytic solution of the present invention makes it possible to provide electrochemical devices excellent in electrochemical characteristics. In particular, in case where the solution is used as a nonaqueous electrolytic solution for electrochemical devices to be mounted on hybrid vehicles, plug-in hybrid vehicles, electric vehicles and the like, there can be obtained electrochemical devices excellent in high-temperature cycle property and in low-temperature property after high-temperature cycles.

The invention claimed is:

1. A nonaqueous electrolytic solution of an electrolyte salt dissolved in a nonaqueous solvent, which comprises a sulfonate compound represented by any of the following general formulae (I) to (III) in an amount of from 0.01 to 10% by mass of the nonaqueous electrolytic solution:

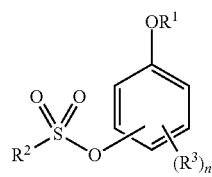
(I)

wherein $R^1$ represents an alkyl group having from 1 to 6 carbon atoms; $R^2$ represents an alkyl group having from 1 to 6 carbon atoms, or a halogenoalkyl group having from 1 to 6 carbon atoms in which at least one hydrogen is substituted with a halogen atom, or an aryl group having from 6 to 12 carbon atoms in which the hydrogen atom may be substituted with a halogen atom; $R^3$ represents a hydrogen atom, an alkyl group having from 1 to 6 carbon atoms, an —$OR^1$ group, an —$OS(=O)_2R^2$ group, an —$OC(=O)R^4$ group, or a halogen atom; n indicates an integer of from 0 to 4; $R^4$ represents a hydrogen atom, an alkyl group having from 1 to 6 carbon atoms, or an alkoxy group having from 1 to 6 carbon atoms,

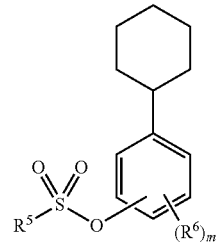
(II)

wherein $R^5$ represents an alkyl group having from 1 to 6 carbon atoms in which at least one hydrogen atom may be substituted with a halogen atom, or an aryl group having from 6 to 12 carbon atoms in which the hydrogen atom may be substituted with a halogen atom; $R^6$ represents a hydrogen atom, a halogen atom, an alkanesulfonyloxy group having from 1 to 6 carbon atoms in which the hydrogen atom may be substituted with a halogen atom, or an arylsulfonyloxy group having from 6 to 12 carbon atoms in which the hydrogen atom may be substituted with a halogen atom; m indicates an integer of from 0 to 4,

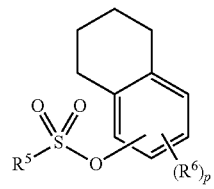
(III)

wherein $R^5$ and $R^6$ are the same as above; p indicates an integer of from 0 to 3.

2. The nonaqueous electrolytic solution according to claim 1, wherein the sulfonate compound is represented by the general formula (II) or (III), and is at least one compound selected from the group consisting of 2-cyclohexylphenyl methanesulfonate, 4-cyclohexylphenyl methanesulfonate, 5,6,7,8-tetrahydronaphthalen-1-yl methanesulfonate, and 5,6,7,8-tetrahydronaphthalen-2-yl methanesulfonate.

3. The nonaqueous electrolytic solution according to claim 2, wherein the sulfonate compound is 2-cyclohexylphenyl methanesulfonate.

4. The nonaqueous electrolytic solution according to claim 2, wherein the sulfonate compound is 4-cyclohexylphenyl methanesulfonate.

5. The nonaqueous electrolytic solution according to claim 2, wherein the sulfonate compound is 5,6,7,8-tetrahydronaphthalen-1-yl methanesulfonate.

6. The nonaqueous electrolytic solution according to claim 2, wherein the sulfonate compound is 5,6,7,8-tetrahydronaphthalen-2-yl methanesulfonate.

7. The nonaqueous electrolytic solution according to claim 1, wherein the nonaqueous solvent is at least one cyclic carbonate selected from the group consisting of ethylene carbonate, propylene carbonate, butylene carbonate, 4-fluoro-1,3-dioxolan-2-one, 4,5-difluoro-1,3-dioxolan-2-one, vinylene carbonate, and vinylethylene carbonate.

8. The nonaqueous electrolytic solution according to claim 1, wherein the nonaqueous solvent comprises at least one linear carbonate selected from the group consisting of:

an asymmetric linear carbonate selected from the group consisting of methyl ethyl carbonate, methyl propyl carbonate, methyl isopropyl carbonate, methyl butyl carbonate and ethyl propyl carbonate, and a symmetric linear carbonate selected from the group consisting of dimethyl carbonate, diethyl carbonate, dipropyl carbonate and dibutyl carbonate.

9. The nonaqueous electrolytic solution according to claim 8, wherein the nonaqueous solvent comprises the asymmetric linear carbonate.

10. The nonaqueous electrolytic solution according to claim 8, wherein the nonaqueous solvent comprises the symmetric linear carbonate.

11. The nonaqueous electrolytic solution according to claim 1, wherein the electrolyte salt comprises at least one selected from the group consisting of $LiPF_6$, $LiBF_4$, $LiN(SO_2CF_3)_2$ and $LiN(SO_2C_2F_5)_2$.

12. The nonaqueous electrolytic solution according to claim 1, further comprising at least one aromatic compound selected from the group consisting of biphenyl, o-terphenyl, cyclohexylbenzene, tert-butylbenzene, tert-amylbenzene and 1,2,3,4-tetrahydronaphthalene.

13. An electrochemical device comprising a positive electrode, a negative electrode, and the nonaqueous electrolytic solution of claim 1.

14. The electrochemical device according to claim 13, wherein the positive electrode comprises, as a positive electrode active material, (i) a composite metal oxide with lithium comprising one or more selected from the group consisting of cobalt, manganese and nickel, (ii) a lithium-containing olivine-type phosphate comprising one or more selected from the group consisting of Fe, Co, Ni and Mn, or both (i) and (ii).

15. The electrochemical device according to claim 14, wherein the positive electrode comprises (i) the composite metal oxide.

16. The electrochemical device according to claim 14, wherein the positive electrode comprises (ii) the lithium-containing olivine-type phosphate.

17. The electrochemical device according to claim 13, wherein the negative electrode comprises one or more selected from the group consisting of lithium metal, a lithium alloy, a carbon material capable of absorbing and releasing lithium, and a metal compound comprising Sn or Si.

18. The nonaqueous electrolytic solution according to claim 1, comprising a sulfonate compound represented by the general formula (I).

19. The nonaqueous electrolytic solution according to claim 1, comprising a sulfonate compound represented by the general formula (II).

20. The nonaqueous electrolytic solution according to claim 1, comprising a sulfonate compound represented by the general formula (III).

* * * * *